(12) United States Patent
Huang et al.

(10) Patent No.: US 11,906,730 B2
(45) Date of Patent: Feb. 20, 2024

(54) LENS PROTECTION DEVICE

(71) Applicant: PEGATRON CORPORATION, Taipei (TW)

(72) Inventors: Mao-Hsiang Huang, Taipei (TW); Pen-Uei Lu, Taipei (TW); Wei-Chih Hsu, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 362 days.

(21) Appl. No.: 17/346,962

(22) Filed: Jun. 14, 2021

(65) Prior Publication Data
US 2022/0026709 A1 Jan. 27, 2022

(30) Foreign Application Priority Data

Jul. 24, 2020 (TW) ................................ 109125154

(51) Int. Cl.
*G02B 27/00* (2006.01)

(52) U.S. Cl.
CPC ................................ *G02B 27/0006* (2013.01)

(58) Field of Classification Search
CPC .... G02B 27/0006; G03B 11/04; G03B 17/04; G03B 15/00; G03B 17/02
USPC ........................................................ 359/513
See application file for complete search history.

(56) References Cited

U.S. PATENT DOCUMENTS 8,240,858 B2 8/2012 Wang

FOREIGN PATENT DOCUMENTS

| CN | 2906682 Y | 5/2007 |
|---|---|---|
| CN | 101995732 A | 3/2011 |
| CN | 107290838 A | 10/2017 |
| CN | 208044282 U | 11/2018 |
| JP | 2006018144 A | 1/2006 |
| JP | 2013222187 A | 10/2013 |
| JP | 6304666 B2 | 4/2018 |

OTHER PUBLICATIONS

Examiner provided machine translation of Akihiko et al., JP JP2006018144 (Year: 2006).*
Examiner provided machine translation of Hiroshi et al., JP H06222424 (Year: 1994).*
Examiner provided machine translation of Masami et al., JP 2013222187 (Year: 2013).*

* cited by examiner

*Primary Examiner* — Balram T Parbadia
*Assistant Examiner* — Rahman Abdur
(74) *Attorney, Agent, or Firm* — Muncy, Geissler, Olds & Lowe, P.C.

(57) ABSTRACT

A lens protection device includes a housing, a first and a second sliding cover. The housing includes an opening and a connecting portion. The first sliding cover includes a first cover plate, a first connecting shaft, and a first and a second magnet. One end of the first connecting shaft connects to the first cover plate and another end pivotally connects to the connecting portion. The first connecting shaft is rotated to move the first cover plate. The first and the second magnet are disposed at a front and a rear end of the first cover plate, respectively. The second sliding cover includes a second cover plate and a second connecting shaft. One end of the second connecting shaft connects to the second cover plate, and another end pivotally connects to the connecting portion. The second connecting shaft is rotated to move the second cover plate.

15 Claims, 6 Drawing Sheets

LENS PROTECTION DEVICE

CROSS-REFERENCE TO RELATED APPLICATION

This application claims the priority benefit of Taiwan application serial no. 109125154, filed on Jul. 24, 2020. The entirety of the above-mentioned patent application is hereby incorporated by reference herein and made a part of this specification.

BACKGROUND

Technical Field

The present disclosure relates to a lens protection device for protecting a lens.

Related Art

With the advancement of science and technology, photographing (video recording) devices for different purposes or occasions are developed, for example, photographing devices for different purposes such as general photography, long-term monitoring, time-lapse photography, or the like. A core element of the photographing device is a lens module. In order to protect the lens module, a lens shield is often additionally provided at outer sides of the lens module. When a photographing function is not used, the lens shield is closed to protect the lens module.

Generally, the lens shield is opened in one direction (toward one side). A movement stroke is relatively long and relatively much time is required to open the lens shield. Currently, a lens shield that is opened in two directions (toward two sides) exists. However, a stepping motor and an electronic switch are needed to control the double-sided shield (or a cover body) to be opened or closed. The stepping motor has a large volume, which necessarily leads to an increased volume of the lens module and an increased volume of the photographing device. Therefore, improvement is necessary.

SUMMARY

In view of the above problems, the present disclosure is mainly intended to provide a lens protection device, to resolve the problem that a conventional double-sided lens shield needs to be controlled by a stepping motor through a structural design of a first sliding cover and a second sliding cover of the lens protection device.

In order to achieve the above purpose, the present disclosure provides a lens protection device, including a housing, a first sliding cover, and a second sliding cover. The housing includes an opening and at least one connecting portion. The first sliding cover includes a first cover plate, a first connecting shaft, a first magnet, and a second magnet. One end of the first connecting shaft is connected to the first cover plate, and another end of the first connecting shaft is pivotally connected to the connecting portion. The first connecting shaft is rotated to move the first cover plate. The first magnet is disposed at a front end of the first cover plate. The second magnet is disposed at a rear end of the first cover plate. The second sliding cover includes a second cover plate and a second connecting shaft. One end of the second connecting shaft is connected to the second cover plate, and another end of the second connecting shaft is pivotally connected to the connecting portion. The second connecting shaft is rotated to move the second cover plate. When the first cover plate is moved in a first direction, the first magnet and a front end of the second cover plate are attracted to each other, so that the first cover plate and the second cover plate are in a closed position to shield the opening. When the first cover plate is moved in a second direction opposite to the first direction, the second magnet and a rear end of the second cover plate are attracted to each other, so that the first cover plate and the second cover plate are in an opened position to expose the opening.

According to an embodiment of the present disclosure, the second cover plate is a magnetic cover plate.

According to an embodiment of the present disclosure, the front end of the second cover plate comprises a third magnet, and the rear end of the second cover plate comprises a fourth magnet.

According to an embodiment of the present disclosure, the second cover plate is made of a material attracted to the first magnet and the second magnet According to an embodiment of the present disclosure, the housing has an arcuate surface, the opening is located at the arcuate surface, and the first cover plate and the second cover plate each are an arcuate structure.

According to an embodiment of the present disclosure, the first connecting shaft and the second connecting shaft are jointly pivotally connected to an axis position of the connecting portion, a length of the first connecting shaft is the same as a length of the second connecting shafts, and the first cover plate and the second cover plate form an unclosed circle.

According to an embodiment of the present disclosure, the first sliding cover is located above the second sliding cover. Moreover, when the first cover plate and the second cover plate are in the closed position or the opened position, an included angle between the first connecting shaft and the second connecting shaft is greater than or less than 180 degrees.

According to an embodiment of the present disclosure, when the first cover plate is moved in the second direction, attraction of the first magnet to the front end of the second cover plate decreases, and the second cover plate is slid by gravity to a balanced position.

According to an embodiment of the present disclosure, when attraction of the second magnet to the rear end of the second cover plate increases, the second cover plate is directed from the balanced position to the opened position.

According to an embodiment of the present disclosure, when the first cover plate is moved in the first direction, attraction of the second magnet to the rear end of the second cover plate decreases, and the second cover plate is slid by gravity to a balanced position.

According to an embodiment of the present disclosure, when attraction of the first magnet to the front end of the second cover plate increases, the second cover plate is directed from the balanced position to the closed position.

According to an embodiment of the present disclosure, the first cover plate has a force application portion. The force application portion is located at the front end of the first cover plate and protrudes from the opening. When the first cover plate is in the opened position, the force application portion is stopped at a periphery of the opening.

According to an embodiment of the present disclosure, the connecting portion has a first limiting portion and a second limiting portion located on two opposite sides of the second connecting shaft, respectively. When the second connecting shaft is stopped at the first limiting portion, the second cover plate is in the closed position. When the second connecting shaft is stopped at the second limiting portion, the second cover plate is in the opened position.

According to an embodiment of the present disclosure, the connecting portion has a third limiting portion and a fourth limiting portion located on two opposite sides of the first connecting shaft, respectively. When the first connecting shaft is stopped at the third limiting portion, the first cover plate is in the closed position. When the first connecting shaft is stopped at the fourth limiting portion, the first cover plate is in the opened position.

According to an embodiment of the present disclosure, the housing further includes a mounting base. The mounting base is disposed inside the housing, and one end of the mounting base extends to form the connecting portion. The mounting base has a lens mounting portion facing the opening.

Based on the above, the lens protection device according to the present disclosure includes a housing, a first sliding cover, and a second sliding cover. The first sliding cover includes a first cover plate and a first connecting shaft, and the second sliding cover includes a second cover plate and a second connecting shaft. One end of the first connecting shaft is connected to the first cover plate and another end of the first connecting shaft is pivotally connected to the connecting portion of the housing, so that the first cover plate can be rotated relative to the housing. One end of the second connecting shaft is connected to the second cover plate and another end of the second connecting shaft is pivotally connected to the connecting portion, so that the second cover plate can be rotated relative to the housing. Therefore, the first cover plate can be manually moved in the first direction or the second direction, and the first cover plate and the second cover plate are in the closed position or the opened position to shield or expose the opening (corresponding to a lens) of the housing.

DETAILED DESCRIPTION

In order to allow reviewers to better understand the technical content of the present disclosure, specific preferred embodiments are described as follows.

Figure 1:
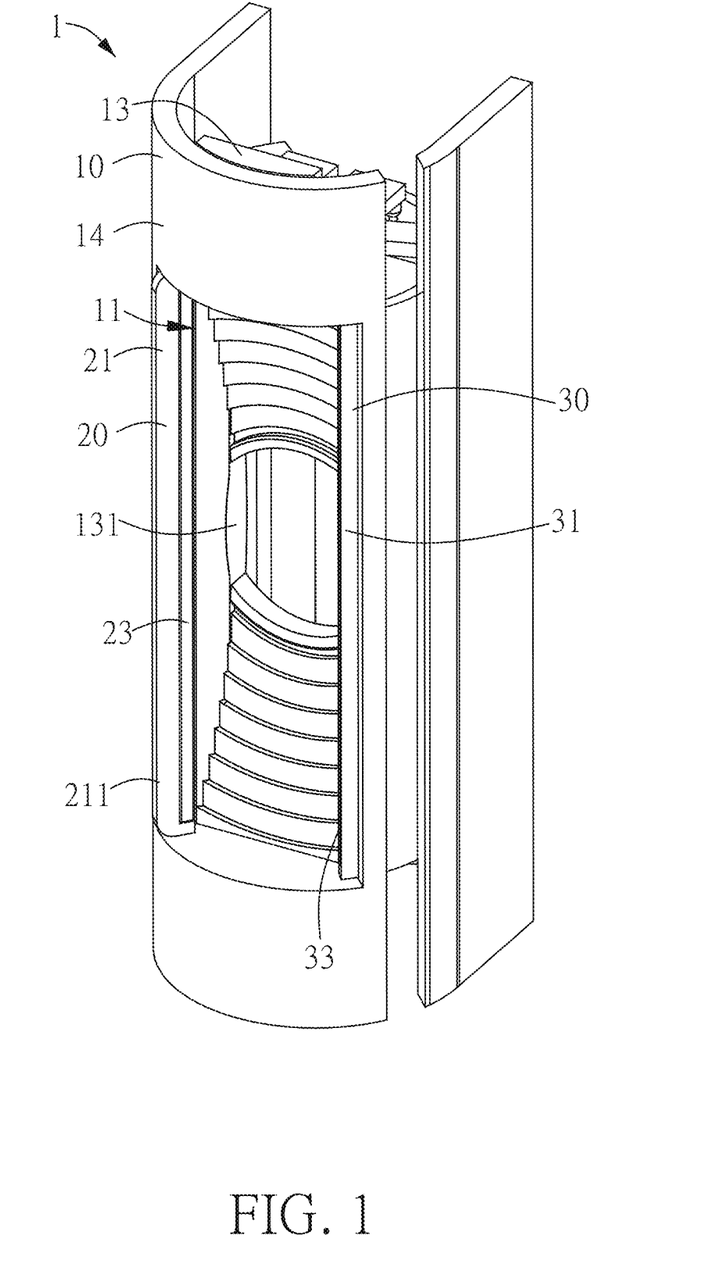
FIG. 1 is a front view of a lens protection device according to an embodiment of the present disclosure.
Figure 2:
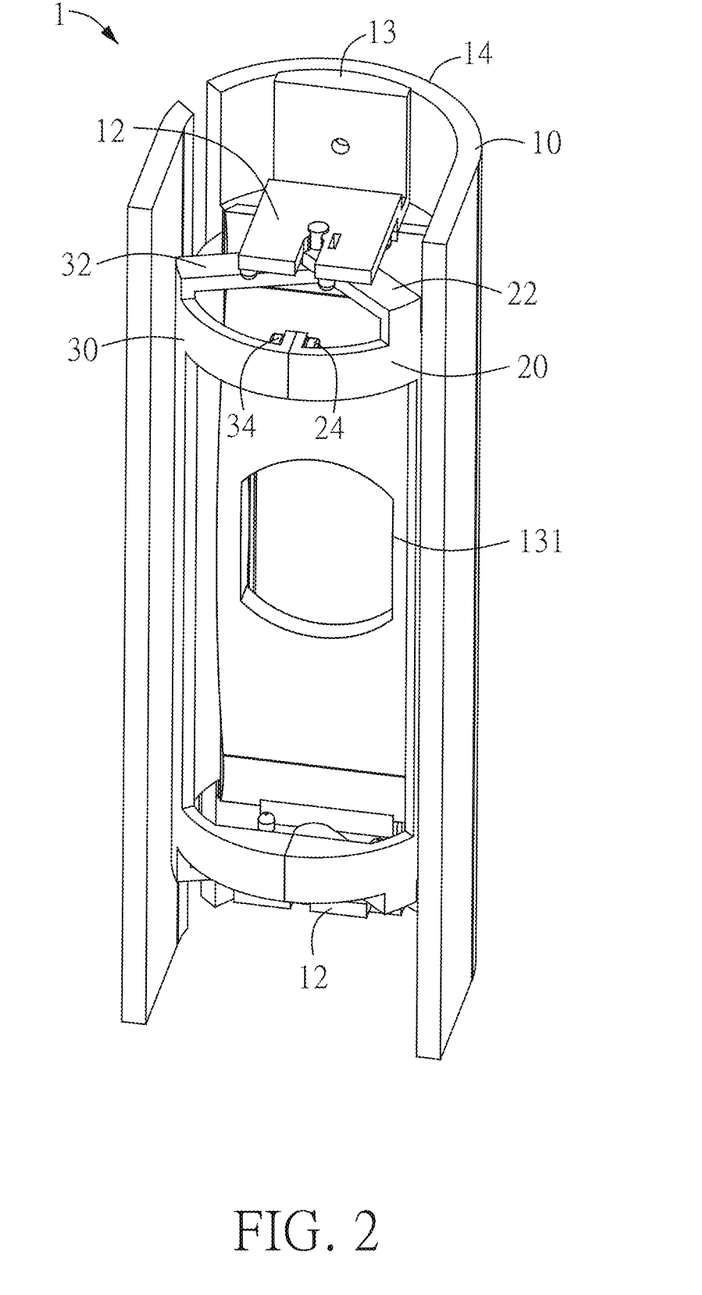
FIG. 2 is a rear view of the lens protection device shown in FIG. 1.
Figure 3:
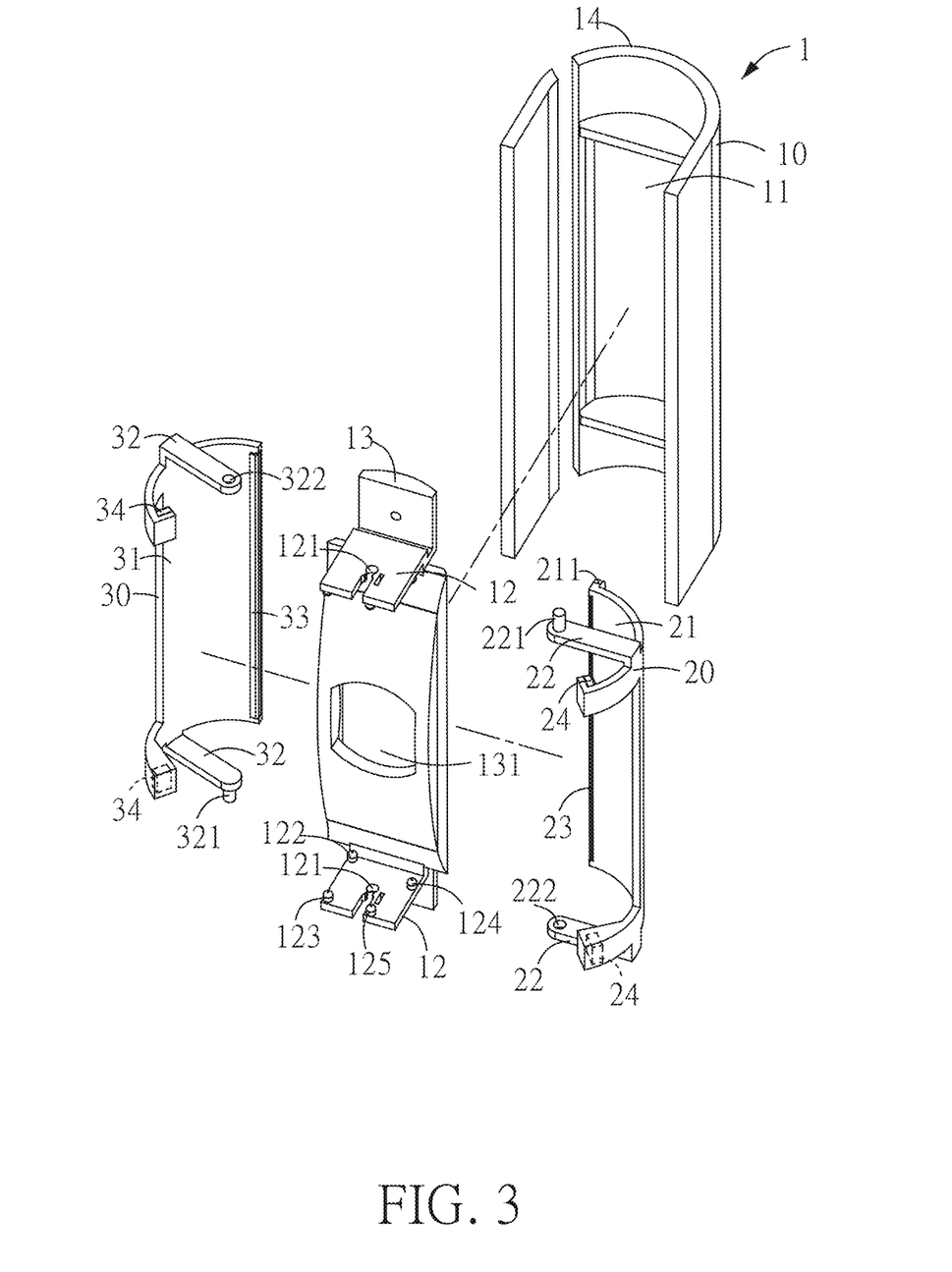
FIG. 3 is a schematic exploded view of the lens protection device shown in FIG. 2.

FIG. 1 is a front view of a lens protection device according to an embodiment of the present disclosure, FIG. 2 is a rear view of the lens protection device shown in FIG. 1, and FIG. 3 is a schematic exploded view of the lens protection device shown in FIG. 2. First referring to FIG. 1, FIG. 2, and FIG. 3, a lens protection device 1 in this embodiment includes a housing 10, a first sliding cover 20, and a second sliding cover 30. The lens protection device 1 may be assembled in a photographing device or an electronic device. For example, a lens module is mounted in the lens protection device 1 to be assembled to a photographing device or an electronic device. The lens protection device 1 in this embodiment shields and protects a lens jointly through the first sliding cover 20 and the second sliding cover 30, and the first sliding cover 20 and the second sliding cover 30 can move into the housing 10. Therefore, the lens protection device 1 can be opened in two directions (toward two sides).

The housing 10 in this embodiment includes an opening 11 and at least one connecting portion 12. The opening 11 corresponds to the lens module mounted in the lens protection device 1, and the connecting portion 12 is configured to connect the first sliding cover 20 to the second sliding cover 30. Preferably, the housing 10 further includes a mounting base 13 disposed inside the housing 10. Moreover, the mounting base 13 has a lens mounting portion 131 for assembling the lens module. The lens mounting portion 131 faces the opening 11, so that the opening 11 can correspond to the lens module after the lens module is mounted. In addition, the housing 10 in this embodiment has two connecting portions 12, which are respectively close to two opposite sides of the housing 10 (an upper side and a lower side shown in FIG. 1 and FIG. 2). The connecting portion 12 in this embodiment is disposed at one end of the mounting base 13. In other words, two opposite ends of the mounting base 13 each extend to form a connecting portion 12.

The housing 10 may have an arcuate surface 14, and the opening 11 is located at the arcuate surface 14. Specifically, a front side of the housing 10 in this embodiment is an arcuate surface 14, two lateral sides are side walls parallel to each other, and a rear side is an opened structure.

The first sliding cover 20 in this embodiment includes a first cover plate 21, first connecting shafts 22, a first magnet 23, and a second magnet 24. The first cover plate 21 is a main structure of the first sliding cover 20, and the first cover plate 21 faces the opening 11 for shielding and protecting the lens. One ends of the first connecting shafts 22 are connected to the first cover plate 21 and another ends of the first connecting shafts 22 are pivotally connected to the connecting portions 12, so that the first cover plate 21 can be rotated relative to the housing 10 by means of the first connecting shafts 22. In other words, the first connecting shafts 22 are rotated to move the first cover plate 21, so that the first cover plate 21 can be rotated relative to the housing 10. Preferably, the first cover plate 21 has an arcuate structure to correspond to the arcuate surface 14. Moreover, the first sliding cover 20 has two first connecting shafts 22 that are respectively connected to two opposite sides of the first cover plate 21 (an upper side and a lower side in FIG. 3) for rotating more stably.

The second sliding cover 30 is similar to the first sliding cover 20. The second sliding cover 30 includes a second cover plate 31 and second connecting shafts 32. The second cover plate 31 is also a main structure of the second sliding cover 30, and the second cover plate 31 faces the opening 11. The second cover plate 31 is disposed adjacent to the first cover plate 21, so that the second cover plate 31 and the first cover plate 21 can jointly shield and protect the lens. Moreover, one ends of the second connecting shafts 32 are connected to the second cover plate 31 and another ends of the second connecting shafts 32 are pivotally connected to the connecting portion 12 at the other ends. The second cover plate 31 can be rotated relative to the housing 10 by means of the second connecting shafts 32. In other words, the second connecting shafts 32 are rotated to move the second cover plate 31, so that the second cover plate 31 can be rotated relative to the housing 10. Preferably, the second cover plate 31 also has an arcuate structure to correspond to the arcuate surface 14. The second sliding cover 30 has two second connecting shafts 32 that are respectively connected to two opposite sides of the second cover plate 31 for rotating more stably.

Figure 4A:
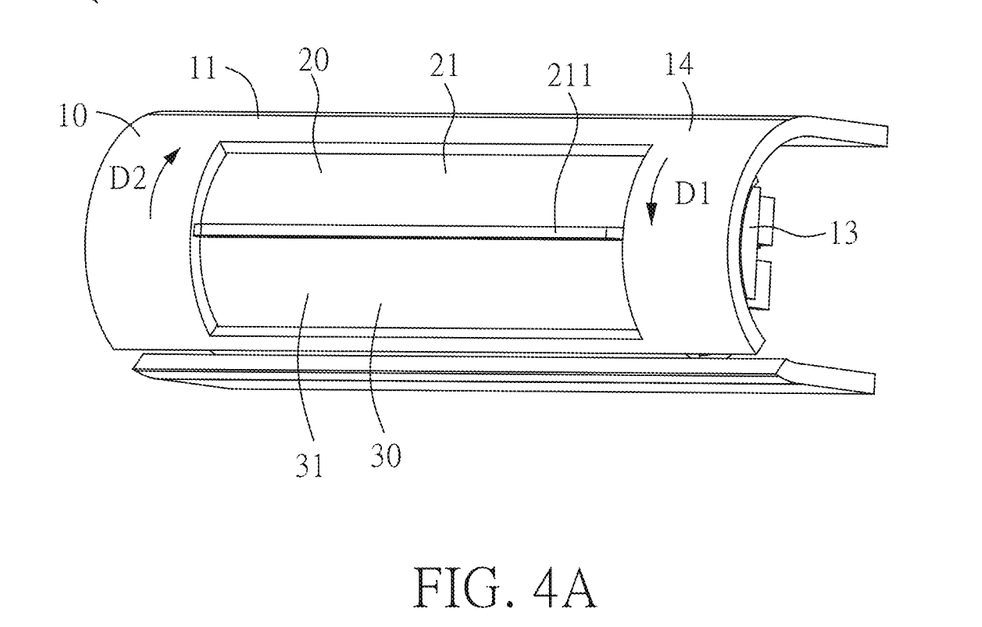
FIG. 4A is a schematic diagram of the lens protection device shown in FIG. 1 in a closed position.
Figure 6A:
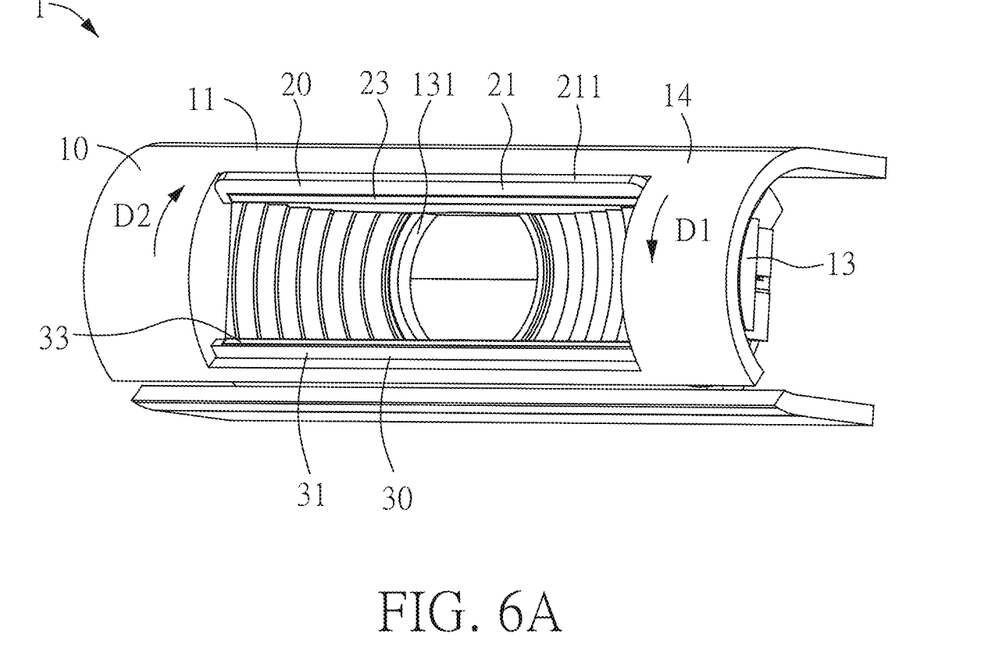
FIG. 6A is a schematic diagram of the lens protection device shown in FIG. 4A moving to the opened position.

Specifically, the first connecting shafts 22 and the second connecting shafts 32 are jointly pivotally connected to an axis position 121 (for example, a pivot hole) of the connecting portion 12. As shown in FIG. 3, the two first connecting shafts 22 respectively have a first pivot 221 and a first axial hole 222. Correspondingly, the two second connecting shafts 32 respectively have a second pivot 321 and a second axial hole 322. The first pivot 221 of one of the first connecting shafts 22 first passes through the second axial hole 322 of one of the second connecting shafts 32, and is then connected to an axis position 121 (a pivot hole) of the connecting portion 12. Similarly, the second pivot 321 of the other of the second connecting shafts 32 first passes through the first axial hole 222 of the other of the first connecting shafts 22, and is then connected to another axis position 121 (a pivot hole) of the connecting portion 12. By means of the above structure, the first connecting shafts 22 and the second connecting shafts 32 can be rotated relative to the housing 10 by using the axis position 121 of the connecting portion 12 as an axis, while driving the first cover plate 21 and the second cover plate 31 to rotate relative to the housing 10. The first cover plate 21 may be moved in a first direction D1 (for example, from a position in FIG. 6A to a position in FIG. 4A), so that the first cover plate 21 and the second cover plate 31 are in a closed position (as shown in FIG. 4A), or the first cover plate 21 may be moved in a second direction D2 (for example, from the position in FIG. 4A to the position in FIG. 6A) opposite to the first direction D1, so that the first cover plate 21 and the second cover plate 31 are in an opened position (as shown in FIG. 6A), thereby shielding or exposing the opening 11 (and the lens mounting portion 131 corresponding to the opening). Details are given below. In other embodiments, as long as the first cover plate 21 and the second cover plate 31 can be rotated relative to the housing 10, the housing 1 may include one connecting portion 12 disposed near the middle area of the mounting base 13, and the first sliding cover 20 and the second sliding cover 30 may have one first connecting shaft 22 and one first connecting shaft 32, respectively.

FIG. 4A is a schematic diagram of the lens protection device shown in FIG. 1 in a closed position. Referring to FIG. 4A, the first cover plate 21 and the second cover plate 31 are moved between the closed position (as shown in FIG. 4A) and the opened position (as shown in FIG. 1) by means of the first connecting shafts 22 and the second connecting shafts 32, respectively. When the first cover plate 21 and the second cover plate 31 are in the closed position, the first cover plate 21 and the second cover plate 31 jointly shield the opening 11 and the lens mounting portion 131 (the lens). Conversely, when the first cover plate 21 and the second cover plate 31 are in the opened position, the first cover plate 21 and the second cover plate 31 are located inside the housing 10 (as shown in FIG. 2), thereby exposing the opening 11 and the lens mounting portion 131 (as shown in FIG. 1) therein.

Figure 4B:
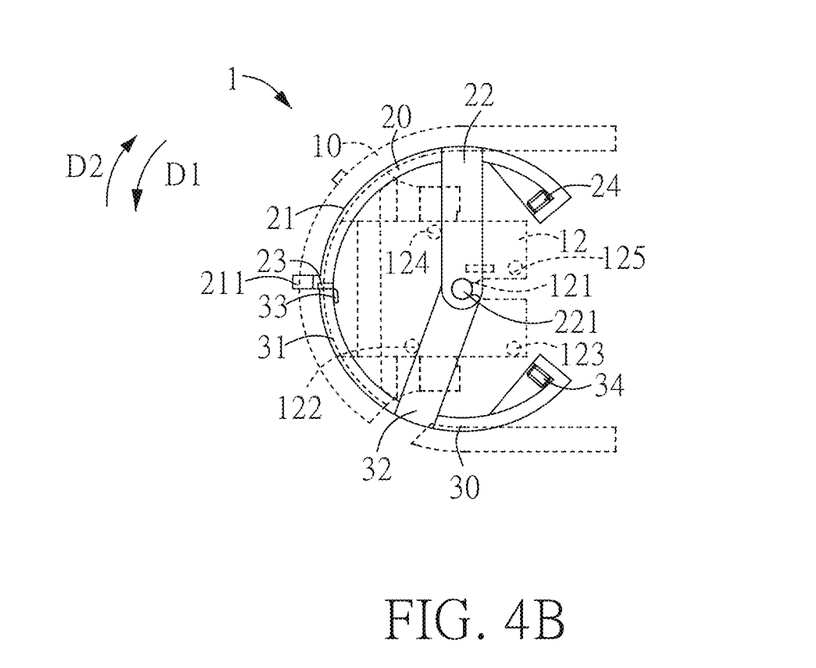
FIG. 4B is a side view of the lens protection device shown in FIG. 4A.
Figure 5A:
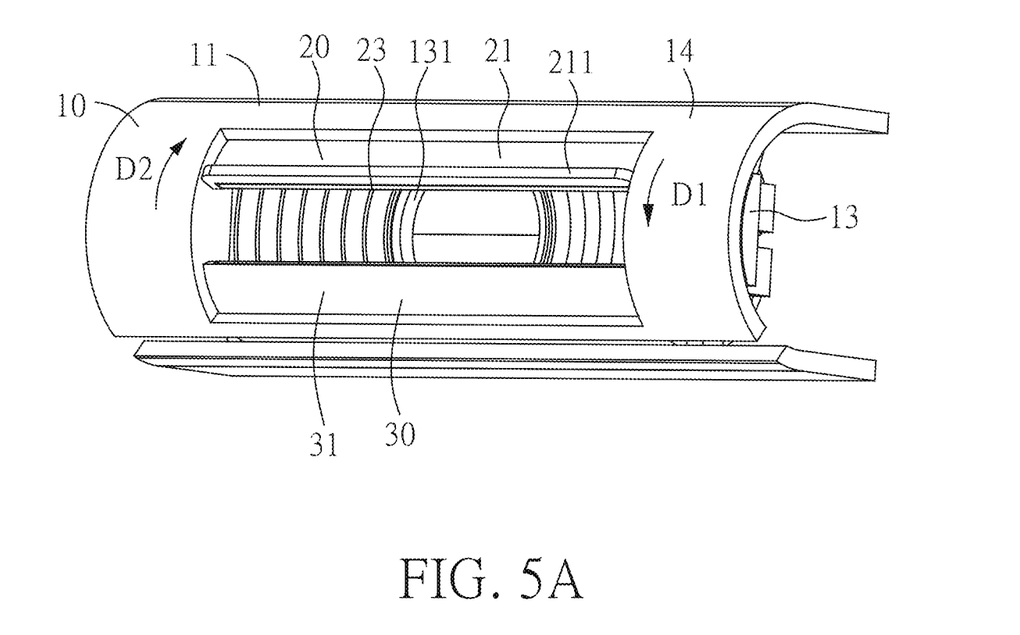
FIG. 5A is a schematic diagram of the lens protection device shown in FIG. 4A moving between the closed position and an opened position.
Figure 5B:
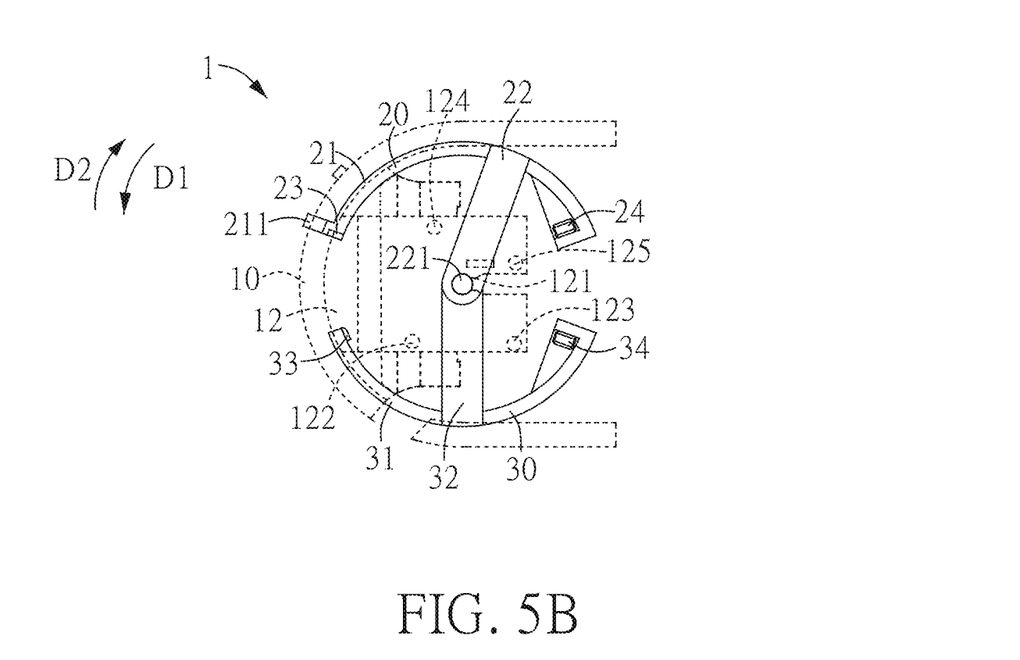
FIG. 5B is a side view of the lens protection device shown in FIG. 5A.
Figure 6B:
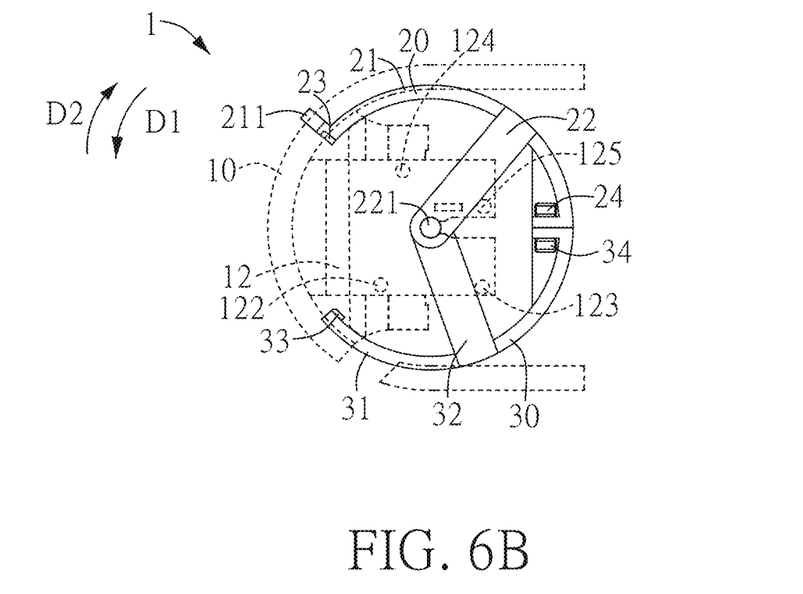
FIG. 6B is a side view of the lens protection device shown in FIG. 6A.

FIG. 4B is a side view of the lens protection device shown in FIG. 4A. FIG. 5A is a schematic diagram of the lens protection device shown in FIG. 4A moving between the closed position and the opened position. FIG. 5B is a side view of the lens protection device shown in FIG. 5A. FIG. 6A is a schematic diagram of the lens protection device shown in FIG. 4A moving to the opened position. FIG. 6B is a side view of the lens protection device shown in FIG. 6A. First referring to FIG. 4A and FIG. 4B, the first sliding cover 20 has a first magnet 23 and a second magnet 24. The first magnet 23 is disposed at a front end of the first cover plate 21, and the second magnet 24 is disposed at a rear end of the first cover plate 21. The front end herein refers to an end close to the opening 11 or a rear end. When the first cover plate 21 and the second cover plate 31 are in the closed position, the first magnet 23 and a front end of the second cover plate 31 are attracted to each other, so that the first cover plate and the second cover plate can be maintained in the closed position (as shown in FIG. 4B). When the first cover plate 21 and the second cover plate 31 are in the opened position, the second magnet 24 and a rear end of the second cover plate 31 are attracted to each other (as shown in FIG. 6B).

Specifically, the second cover plate 31 is a magnetic cover plate. In some embodiments, the magnetic cover plate may be made of a material that can be attracted to a magnet, or the second cover plate 31 has elements that can be attracted to a magnet. Alternatively, the second cover plate 31 has two magnetic members respectively disposed at the front end and the rear end of the second cover plate 31. In this embodiment, the second cover plate 31 has a third magnet 33 and a fourth magnet 34. The third magnet 33 is disposed at the front end of the second cover plate 31, and the fourth magnet 34 is disposed at the rear end of the second cover plate 31. When the first cover plate 21 and the second cover plate 31 are in the closed position, the first magnet 23 and the third magnet 33 are attracted to each other, so that the first cover plate and the second cover plate can be maintained in the closed position. When the first cover plate 21 and the second cover plate 31 are in the opened position, the second magnet 24 and the fourth magnet 34 are attracted to each other.

In this embodiment, when the first cover plate 21 and the second cover plate 31 are in the closed position or the opened position, included angles between the first connecting shafts 22 and the second connecting shafts 32 are greater than or less than 180 degrees. Stated another way, when the first cover plate 21 and the second cover plate 31 are in the closed position or the opened position, the first connecting shafts 22 and the second connecting shafts 32 are not located on the same straight line, so that there are included angles between the first connecting shafts 22 and the second connecting shafts 32. If the first cover plate 21 and the second cover plate 31 have a semicircular structure, when the first cover plate 21 and the second cover plate 31 are in the closed position or the opened position, the first connecting shafts 22 and the second connecting shafts 32 are located on the same straight line. Conversely, when the first cover plate 21 and the second cover plate 31 in this embodiment are in the closed position or the opened position, the included angles between the first connecting shafts 22 and the second connecting shafts 32 are greater than or less than 180 degrees, and therefore the first cover plate 21 and the second cover plate 31 have an arcuate structure smaller than a semicircle.

Specifically, lengths of the first connecting shafts 22 are the same as lengths of the second connecting shafts 32, and the first cover plate 21 and the second cover plate 31 form an unclosed circle. In other words, the first cover plate 21 and the second cover plate 31 are unclosed circles to leave a space for movement. Preferably, when the first cover plate 21 and the second cover plate 31 are in the closed position or the opened position, an interval (an arc length) between the first cover plate 21 and the second cover plate 31 is close to an arc length of the opening 11 on the arcuate surface 14.

By means of the above structure, the first sliding cover 20 or the second sliding cover 30 can move and swing. In this embodiment, the second sliding cover 30 is given by way of example for description. When the lens protection device 1 is applied to the photographing device, the first sliding cover 20 is located above the second sliding cover 30, as shown in FIG. 4A, FIG. 5A, and FIG. 6A. First referring to FIG. 4A and FIG. 4B, when the photographing (video recording) function is to be used, a user may manually pull the first cover plate 21 upward (that is, pull the first cover plate toward a side of the opening 11), so that the first cover plate 21 is moved in a second direction D2. When the first cover plate 21 is moved in the second direction D2, attraction of the first magnet 23 to the third magnet 33 (the front end of the second cover plate 31) decreases, so that the second cover plate 31 is slid by gravity to a balanced position (as shown in FIG. 5A and FIG. 5B). It should be noted that the second connecting shafts 32 are parallel to the direction of gravity, so that the second cover plate 31 can be in the balanced position.

Then the first cover plate 21 is continuously moved in the second direction D2. When the first cover plate 21 approaches the opened position, attraction of the second magnet 24 to the fourth magnet 34 (the rear end of the second cover plate 31) increases, so that the second cover plate 31 can be directed from the balanced position to the opened position, as shown in FIG. 6A and FIG. 6B. Movement tracks of the first cover plate 21 and the second cover plate 31 are a closed circle. Then, the second magnet 24 and the fourth magnet 34 (the rear end of the second cover plate 31) are attracted to each other, so that the first cover plate 21 and the second cover plate 31 are continuously in the opened position to expose the opening 11.

Conversely, if the opening 11 needs to be shielded, the first cover plate 21 is moved in the first direction D1. When the first cover plate 21 is moved in the first direction D1, attraction of the second magnet 24 to the fourth magnet 34 (the rear end of the second cover plate 31) decreases, so that the second cover plate 31 is also slid by gravity to the balanced position (as shown in FIG. 5A and FIG. 5B). When the first cover plate 21 approaches the closed position, attraction of the first magnet 23 to the third magnet 33 (the front end of the second cover plate 31) increases, so that the second cover plate 31 can be directed to the closed position (as shown in FIG. 4A and FIG. 4B). Then, the first magnet 23 and the third magnet 33 (the front end of the second cover plate 31) are attracted to each other, so that the first cover plate 21 and the second cover plate 31 are continuously in the closed position to shield the opening 11.

Preferably, the first cover plate 21 in this embodiment has a force application portion 211 located at the front end of the first cover plate 21. The force application portion 211 protrudes from the opening 11, so that the force application portion 211 can be moved along the opening 11. A user may apply a force to the first cover plate 21 by pulling the force application portion 211 to move the first cover plate 21 in the first direction D1 or the second direction D2. When the first cover plate 21 is moved in the second direction D2, the force application portion 211 is moved along the opening 11 and is stopped at a periphery of the opening 11. In this way, the first cover plate 21 is in the opened position and a limiting effect is achieved. Stated another way, the first cover plate 21 can be prevented from moving backward, so that the first cover plate 21 can be in the opened position.

Referring to FIG. 3 and FIG. 4B, preferably, the connecting portion 12 has first limiting portions 122 and second limiting portions 123. The first limiting portions 122 and second limiting portions 123 are located on two opposite sides of the second connecting shafts 32, respectively, for positioning the second cover plate 31 in the closed position and the opened position. Specifically, when the second cover plate 31 is moved to positions of the first limiting portions 122, one sides of the second connecting shafts 32 are stopped at the first limiting portions 122, so that the second cover plate 31 is in the closed position (as shown in FIG. 4B). When the second cover plate 31 is moved to positions of the second limiting portions 123, the other sides of the second connecting shafts 32 are stopped at the second limiting portions 123, so that the second cover plate 31 is in the opened position (as shown in FIG. 6B). The arrangement of the first limiting portions 122 and the second limiting portions 123 can restrict the second sliding cover 30 to move within a specific range. Stated another way, the second cover plate 31 can be prevented from moving to a position at which the opening 11 cannot be shielded as a result of excessive attraction of the first magnet 23 or the second magnet 24 to the second sliding cover 30.

Preferably, the connecting portion 12 has third limiting portions 124 and fourth limiting portions 125. The third limiting portions 124 and the fourth limiting portions 125 are respectively located on two opposite sides of the first connecting shafts 22 for positioning the first cover plate 21 in the closed position and the opened position. Similarly, when the first cover plate 21 is moved to positions of the third limiting portions 124, one sides of the first connecting shafts 22 are stopped at the third limiting portions 124, so that the first cover plate 21 is in the closed position (as shown in FIG. 4B). When the first cover plate 21 is moved to positions of the fourth limiting portions 125, the other sides of the first connecting shafts 22 are stopped at the fourth limiting portions 125, so that the first cover plate 21 is in the opened position (as shown in FIG. 6B). Similarly, the arrangement of the third limiting portions 124 and the fourth limiting portions 125 can restrict the first sliding cover 20 to move within a specific range. Stated another way, the first cover plate 21 or the second cover plate 31 can be prevented from moving to a position at which the opening 11 cannot be shielded as a result of excessive attraction between the first magnet 23 and the third magnet 33 or between the second magnet 24 and the fourth magnet 34.

Based on the above, the lens protection device according to the present disclosure includes a housing, a first sliding cover, and a second sliding cover. The first sliding cover includes a first cover plate and a first connecting shaft, and the second sliding cover includes a second cover plate and a second connecting shaft. The first connecting shaft is connected to the first cover plate at one end and pivotally connected to the connecting portion of the housing at the other end, so that the first cover plate can be rotated relative to the housing. The second connecting shaft is connected to the second cover plate at one end and pivotally connected to the connecting portion at the other end, so that the second cover plate can be rotated relative to the housing. Therefore, the first cover plate can be manually moved in the first direction or the second direction, so that the first cover plate and the second cover plate are in the closed position or the opened position to shield or expose the opening (corresponding to a lens) of the housing.

It should be noted that the above embodiments are merely examples for description, and the scope of rights claimed in the present disclosure should be subject to the scope of the patent application, rather than being limited to the above embodiments.

What is claimed is:

1. A lens protection device, comprising:
   a housing comprising an opening and at least one connecting portion;
   a first sliding cover comprising:
      a first cover plate;
      a first connecting shaft, wherein one end of the first connecting shaft is connected to the first cover plate, another end of the first connecting shaft is pivotally connected to the connecting portion, and the first connecting shaft is rotated to move the first cover plate;
      a first magnet disposed at a front end of the first cover plate; and
      a second magnet disposed at a rear end of the first cover plate; and
   a second sliding cover comprising:
      a second cover plate, a rear end of the second cover plate corresponding to the rear end of the first cover plate; and
      a second connecting shaft, wherein one end of the second connecting shaft is connected to the second cover plate, another end of the second connecting shaft is pivotally connected to the connecting portion, the second connecting shaft is rotated to move the second cover plate, when the first cover plate is moved in a first direction, the first magnet and a front end of the second cover plate are attracted to each other, so that the second cover plate is moved in a second direction opposite to the first direction, and the first cover plate and the second cover plate are in a closed position to shield the opening, and when the first cover plate is moved in the second direction, the second magnet and the rear end of the second cover plate are attracted to each other, so that the second cover plate is moved in the first direction and toward the rear end of the first cover plate, and the first cover plate and the second cover plate are in an opened position to expose the opening.

2. The lens protection device according to claim 1, wherein the second cover plate is a magnetic cover plate.

3. The lens protection device according to claim 2, wherein the front end of the second cover plate comprises a third magnet, and the rear end of the second cover plate comprises a fourth magnet.

4. The lens protection device according to claim 2, the second cover plate is made of a material attracted to the first magnet and the second magnet.

5. The lens protection device according to claim 1, wherein the housing has an arcuate surface, the opening is located at the arcuate surface, and the first cover plate and the second cover plate each are an arcuate structure.

6. The lens protection device according to claim 5, wherein the first connecting shaft and the second connecting shaft are jointly pivotally connected to an axis position of the connecting portion, a length of the first connecting shaft is the same as a length of the second connecting shaft, and the first cover plate and the second cover plate form an unclosed circle.

7. The lens protection device according to claim 6, wherein the first sliding cover is located above the second sliding cover, and when the first cover plate and the second cover plate are in the closed position or the opened position, an included angle between the first connecting shaft and the second connecting shaft is greater than or less than 180 degrees.

8. The lens protection device according to claim 7, wherein when the first cover plate is moved in the second direction, attraction of the first magnet to the front end of the second cover plate decreases, and the second cover plate is slid by gravity to a balanced position.

9. The lens protection device according to claim 8, wherein when attraction of the second magnet to the rear end of the second cover plate increases, the second cover plate is directed from the balanced position to the opened position.

10. The lens protection device according to claim 7, wherein when the first cover plate is moved in the first direction, attraction of the second magnet to the rear end of the second cover plate decreases, and the second cover plate is slid by gravity to a balanced position.

11. The lens protection device according to claim 10, wherein when attraction of the first magnet to the front end of the second cover plate increases, the second cover plate is directed from the balanced position to the closed position.

12. The lens protection device according to claim 1, wherein the first cover plate comprises a force application portion located at the front end of the first cover plate and protruding from the opening, and when the first cover plate is in the opened position, the force application portion is stopped at a periphery of the opening.

13. The lens protection device according to claim 1, wherein the connecting portion comprises a first limiting portion and a second limiting portion located on two opposite sides of the second connecting shaft, respectively, when the second connecting shaft is stopped at the first limiting portion, the second cover plate is in the closed position, and when the second connecting shaft is stopped at the second limiting portion, the second cover plate is in the opened position.

14. The lens protection device according to claim 1, wherein the connecting portion comprises a third limiting portion and a fourth limiting portion located on two opposite sides of the first connecting shaft, respectively, when the first connecting shaft is stopped at the third limiting portion, the first cover plate is in the closed position, and when the first connecting shaft is stopped at the fourth limiting portion, the first cover plate is in the opened position.

15. The lens protection device according to claim 1, wherein the housing further comprises a mounting base disposed inside the housing, one end of the mounting base extends to form the connecting portion, and the mounting base comprises a lens mounting portion facing the opening.

* * * * *